(12) United States Patent  (10) Patent No.: US 6,688,010 B1
Schwaerzler  (45) Date of Patent: Feb. 10, 2004

(54) SYSTEM FOR DETERMINING THE HEIGHT OF A GEODETIC TOOL

(75) Inventor: Johannes Gallus Schwaerzler, Lauterach (AT)

(73) Assignee: Leica Geosystems AG (CH)

( * ) Notice: Subject to any disclaimer, the term of this patent is extended or adjusted under 35 U.S.C. 154(b) by 0 days.

(21) Appl. No.: 09/889,613
(22) PCT Filed: Jan. 19, 2000
(86) PCT No.: PCT/EP00/00412
§ 371 (c)(1),
(2), (4) Date: Oct. 11, 2001
(87) PCT Pub. No.: WO00/43732
PCT Pub. Date: Jul. 27, 2000

(30) Foreign Application Priority Data

Jan. 19, 1999 (CH) .................................................. 88/99
Jan. 19, 1999 (CH) .................................................. 87/99

(51) Int. Cl.[7] .............................. G01C 5/00; G01B 3/10
(52) U.S. Cl. ............................ 33/290; 33/394; 33/758; 33/759; 33/760; 33/768; 33/770
(58) Field of Search ........................ 33/290, 291, 292, 33/392, 393, 394, 281, 282, 755, 759, 760, 761, 765, 766, 769, 770, 275 R, 679.1, 758, 768

(56) References Cited

U.S. PATENT DOCUMENTS

| 302,609 | A | * | 7/1884 | Wells | 33/290 |
|---|---|---|---|---|---|
| 3,354,549 | A | * | 11/1967 | Fisher | 33/397 |
| 4,339,880 | A | | 7/1982 | Hall | |
| 4,489,500 | A | * | 12/1984 | Valat | 33/394 |
| 4,574,486 | A | * | 3/1986 | Drechsler | 33/765 |
| 4,691,444 | A | * | 9/1987 | Capps | 33/290 |
| 4,888,881 | A | | 12/1989 | Dudley | |
| 5,142,793 | A | * | 9/1992 | Crane | 33/755 |
| 5,159,760 | A | | 11/1992 | Spiegel et al. | |
| 5,433,014 | A | * | 7/1995 | Falk et al. | 33/755 |
| 5,552,886 | A | * | 9/1996 | Kitajima et al. | 33/291 |
| 5,639,966 | A | * | 6/1997 | Whitted | 33/299 |
| 5,720,106 | A | | 2/1998 | Serksnis et al. | |
| 5,949,548 | A | * | 9/1999 | Shirai et al. | 33/292 |
| 6,178,655 | B1 | * | 1/2001 | Potter et al. | 33/761 |
| 6,237,243 | B1 | * | 5/2001 | Cook | 33/770 |
| 6,470,582 | B1 | * | 10/2002 | Renko | 33/759 |

* cited by examiner

Primary Examiner—Christopher W. Fulton
Assistant Examiner—Madeline Gonzalez
(74) Attorney, Agent, or Firm—Rothwell, Figg, Ernst & Manbeck, P.C.

(57) ABSTRACT

The invention relates to a system for determining the height of a tripod-mounted geodetic tool using a reference area. Said system comprises a spacer element (20) to be mounted on the tripod (25) and means (2) for linear measurement which are to be applied on the spacer element (20). A scale is disposed on the means (2) in such a manner as to directly indicate the height (h) of the tool (28). The means are preferably configured as a tape measure (2) or a plumb bar (1'). The invention provides a means for measuring the height of the tool outside the plumb line (32) with a sufficient amount of exactness and without substantial additional costs and/or effort.

10 Claims, 7 Drawing Sheets

SYSTEM FOR DETERMINING THE HEIGHT OF A GEODETIC TOOL

BACKGROUND OF THE INVENTION

1. Field of the Invention

The invention relates to a system for determining the height of a tripod-mounted geodetic tool above a reference area-to a spacer and a distance measuring device for such a system.

2. Description of the Related Art

For surveying tasks using geodetic tools, it is necessary to know, for example, the height of the optical axis of the tool above a reference area. The reference area is defined by a geodetic point of reference (reference point) which is marked, for example in a boundary stone.

In DE 40 07 245 A1, a laser apparatus mounted on a tribrach prior to assembly and intended for perpendicular positioning above the reference point is used. The height of the device above the reference point is then to be determined using the laser. Reference points are, for example, generally marked in a boundary stone by indentations or notches. The reference plane is however defined by the maximum projection of the boundary stone. The measurement by means of a laser beam is therefore inaccurate.

Other systems use measuring tapes in the form of roll-type tape measures. The roll-type tape measure is fastened to an adapter (height measuring bracket, height hook) so that it is present in the plumb line above the reference point during the measurement. Known adapters are fastened by means of a spindle in a centering bush of the tool and run around the tripod and the tripod head into the plumb line. An operator pulls the tape measure out of the roll-type tape measure and runs it to the boundary stone. The height of the tool is indicated on a mark on the roll-type tape measure. The measuring procedure is difficult and susceptible to inaccuracies because, on the one hand, the end of the roll-type tape measure has to be held by the user on the boundary stone and, on the other hand, the mark has to be read at a height. Wind-related inaccuracies may also occur. Such adapters consist of metal and are relatively bulky. This make them problematic to transport.

U.S. Pat. No. 5,720,106 describes a measurement of the slope height of a tripod-mounted geodetic tool above the reference area outside the plumb line. Here, however, it is the uncorrected slope height that is indicated on the mark to be read on the roll-type tape measure. The true height of the geodetic tool above the reference area can be calculated based on the slope height and the on the geometrical relationships of the tripod-mounted geodetic tool.

SUMMARY OF THE INVENTION

It is the object of the invention to provide a system of the type stated at the outset for determining the height of a tripod-mounted geodetic tool above a reference area, which system gives sufficiently accurate measurement using simple means.

The arrangement, according to the invention, departs from the principle of measuring inside the plumb line. Instead, the measuring distance makes an angle with the plumb line. By a suitable design of the scale, the perpendicular height above the reference point can nevertheless be read with sufficient accuracy.

On the one hand, a roll-type tape measure which is fastened to a spacer attached to the tribrach or to the instrument, drawn downward and placed against the reference area relative to the point of reference is suitable for the length measurement. The scale on the graduated tape of the roll-type tape measure is adapted and shows not, for example, the length of the measured distance but directly the required perpendicular height of the tool above the point of reference. Alternatively, it is possible to use a measuring stick, for example a plumb bar, which is placed on the reference area in the vicinity of the reference point and is to be read at the spacer. The scale mounted on the plumb bar in turn indicates the perpendicular height. The spacer has relatively small external dimensions compared with known adapters, while roll-type tape measure and plumb bar are in any case carried by the user of the geodetic tool in the standard equipment.

The scale of the roll-type tape measure or plumb bar has nonlinear divisions and—provided that the spacer is aligned horizontally—is calculated using Pythagoras' law, which relates the lengths of the sides of a right-angled triangle to one another. The catheti of the right-angled triangle are formed by the distance from the point of engagement or end of the spacer to the plumb line and the height of this spacer plane above the reference area at the reference point along the plumb line. The hypotenuse of the right-angled triangle is given by the distance between the reference area at the reference point and the end of the spacer. If it is not intended to arrange the spacer horizontally on the tool, the scale of the measuring device coordinated with the spacer, whether roll-type tape measure or plumb bar, is calculated in a correspondingly different manner. What is advantageous is that it is not necessary for the measuring spindle, the measuring blade or a stop of the roll-type tape measure or an end of the plumb bar to be placed directly on the reference point on which the plumb line stands, but can be positioned slightly outside. The resulting inaccuracy of the measurement can be neglected. Rather, the roll-type tape measure or the plumb bar can now be placed on the highest point of the reference point, for example of the boundary stone which defines the reference plane.

If, for example, a roll-type tape measure which is also to be used for measuring lengths other than the height of the tool is now used for measuring the length, application of the nonlinear scale in coded form is then possible—in order to avoid uncertainties in reading. This is also true for the use of an inch rule.

In the context of the present invention, "coded representation" of a scale is intended to mean representations which can be read not directly but only indirectly, whether, for example, by interspersing a mirror (in which case the scale representation is mounted as a mirror image on the scale support), whether via special color filter (in which case the scale representation is in false colors and cannot be differentiated with the naked eye) or whether by interspersing an anamorphotic lens (in which case the scale is mounted with distortion and defocusing). The above examples for coded representation are not definitive. Thus, for example, the provision of reading slides or windows with staggered grid is possible which permits reading of the scale only in cooperation with an opposite grid making it difficult or impossible to read the scale on the scale support directly.

If, for example, a scale is mounted on the scale support in the coded form described above, it can be read only using the corresponding reading means. If the operator attempts to read this coded scale at the reading mark which is coordinated with the scale mounted in uncoded form, the error will be directly evident. Reading is difficult if not impossible. In a corresponding manner, a reading error is avoided for the scale mounted in uncoded form if the operator attempts to read this scale using the reading means.

With the use of a cylindrical lens whose axis runs along the scale support, a compressed scale which is readable only by means of the cylindrical lens can be mounted—preferably in the middle of the scale support. Above and below the compressed scale, which is visible to the naked eye only as a dotted line, in each case directly readable and optionally further, only indirectly readable scales can be mounted. The compressed scale can in this case simultaneously serve as a separating line for different scales above and below it.

Since in general only a relatively small scale region can be read using the reading means, measures are taken to ensure reading which is as error-free as possible. This is achieved, for example, by specially designed scales and/or the magnification of the reading region.

Thus, the scale can be modified in such a way that, even in a relatively small reading region, it is clearly visible in which direction of the scale the numbers are arranged in ascending order.

The housing need not be made larger in order to increase the size of the reading region. The reading region can be broadened, for example, by providing a mirror which is inclined at an acute angle instead of at an angle of 45°. The image of the scale is thus compressed and a reading error—due to divisions to be read as mirror images—is avoided because several numbers arranged in ascending order corresponding to the scale of the graduated scale appear in the field of view.

Alternatively or in addition to the mirror inclined at an acute angle, it is also possible to use a concave mirror or a corresponding concave prism in order to compress the scale. Furthermore, a scattering lens may be present before a mirror. Although this leads to slight distortions at the edge of the field of vision, depending on the quality of the mirror or the lens, said distortions do not adversely affect the reading.

A similar result is obtained if the running surface on which the scale support moves past the reading mark is not flat but curved. The scale appears compressed and will have small distortions in the edge regions. The distance from scale support to reading mark will have to be kept as small as possible and constant.

The scales can be mounted both on opposite sides of the scale support and on the same side. The scales differ, for example, in having different starting points to which the graduations noted along the scale relate. The scales can also have different linear or nonlinear dependencies—based on the length to be measured. In general, the invention can be advantageously applied when scale graduation and marking (apart from the coded representation) of different scales are not identical. Thus, it would be possible to use this system—independently of the application described here—also for angle-measuring instruments (degree or radian graduation) or velocity-measuring instruments (kilometers or miles per hour).

The reading marks coordinated with the different scales, for example for roll-type tape measures, can be arranged at different points of the housing. The distance between the two marks is at least sufficiently large that good readability is ensured and the marks can be sufficiently clearly distinguished by the operator.

The scale mounted in coded form on the scale support is expediently located —for roll-type tape measures—on the side which, when rolled up on the scale support, the scale tape roll, faces outward. The reading means is then fastened in the housing wall, opposite the roll.

Expediently, the scale support—for roll-type tape measures—is passed along a running surface or over a gangway opposite the reading mark of the reading means. The distance between mirror and scale support remains the same, regardless of the drawn-out length of the scale tape. Parallax when reading is thus reduced. In order practically completely to rule out the reading error due to parallax, a reading mark is applied not only on that side of the reading means which faces the scale support but also on the side facing the user.

The running surface furthermore results in a constant draw-out angle because the scale support in any case runs over this.

The reading mark is expediently a clearly readable line marked in color.

The measuring device according to the invention permits selective reading of the individual scale, which must be performed in a deliberate manner, makes the reading reliable and prevents mistakes. The roll-type tape measure used in the case of the height-measuring tool according to the invention can of course also be used quite normally in the usual way as a roll-type tape measure without mistakes occurring in the reading.

The scale tape can be held taut by the operator. Even in a strong wind, the accuracy of measurement is thus maintained.

BRIEF DESCRIPTION OF THE SEVERAL VIEWS OF THE DRAWINGS

The invention is explained in more detail below with reference to the Figures shown in the drawing.

FIG. 4b shows a plan view of the spacer shown in FIG. 4a;

DETAILED DESCRIPTION OF THE PREFERRED EMBODIMENTS

Figure 1:
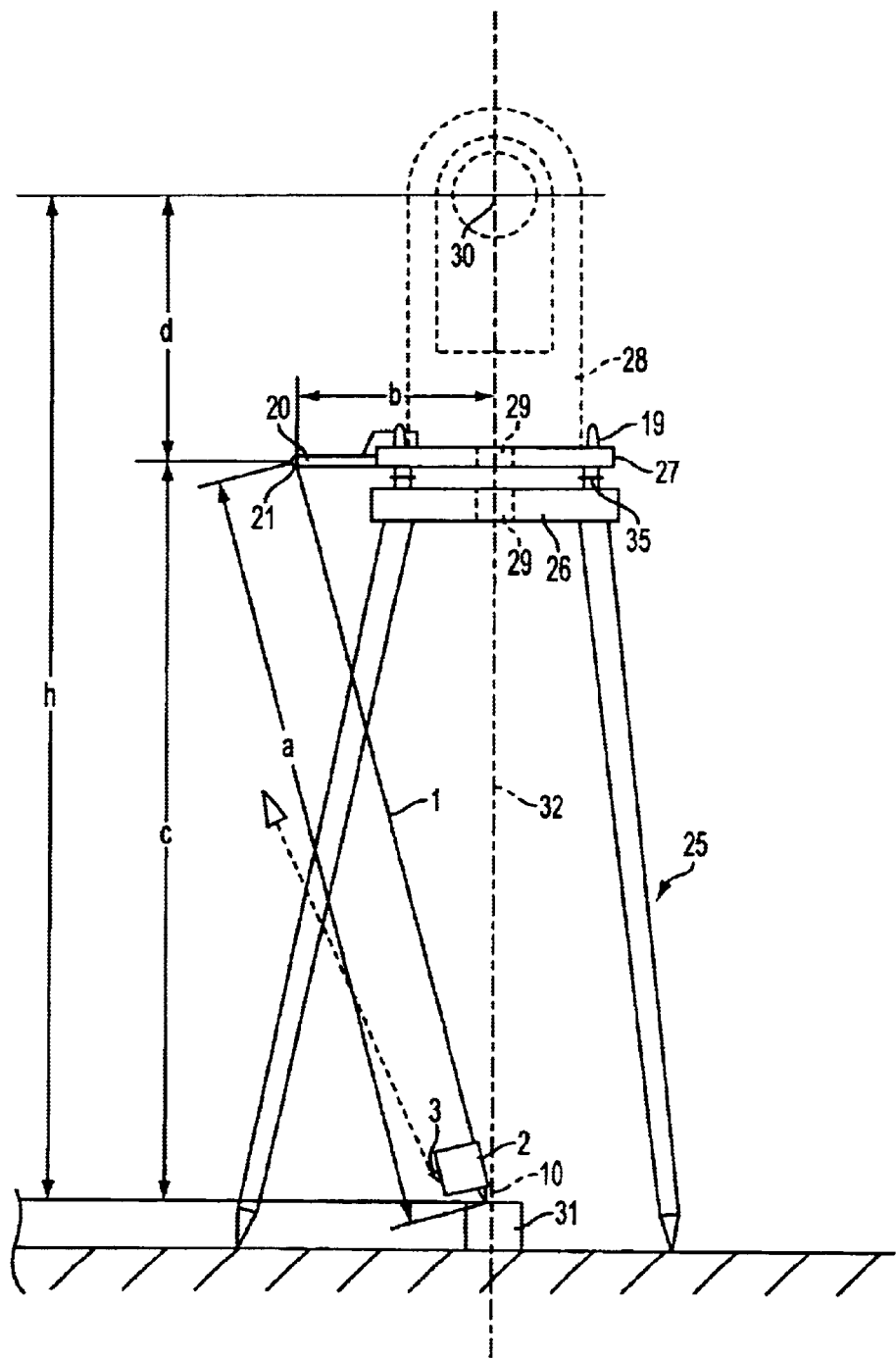
FIG. 1 shows a system for measuring the height using a roll-type tape measure.

FIG. 1 shows a conventional tripod-25, of which two legs are shown. A conventional tribrach 27 which is horizontally aligned is attached to the tripod plate 26 at the top of the tripod. The tribrach 27 has been prepared for holding, for example, a tool 28. Tripod plate 26 and tribrach 27 have respective central holes 29 through which the laser beam of a laser positioning device (not shown) or an opticalplumb is directed in order to align the tribrach 27 perpendicularly above the reference point marked in a boundary stone 31. The horizontal alignment of the tribrach 27 is effected by means of adjusting screws 35 which have caps 19 at the top of the tribrach 27.

In order to carry out measuring tasks using the tool 28, it is necessary, for example, to know the height of its optical axis 30 above the reference point. The measuring system for determining this or another desired height comprises a spacer 20 fastened to a corner of the tribrach 27 and a roll-type tape measure 2 corresponding to FIGS. 2, 2a or FIG. 2b with a scale tape 1. The draw-out end of the scale tape 1 is hooked, at the end of a spacer 20, into a corresponding holder on the retaining part 21 of the spacer. The housing 2' of the roll-type tape measure 2 is drawn downward by the operator and is placed with a measuring spindle 10 on the reference point or in its immediate vicinity. The scale on the scale tape 1 is applied in the form of a mirror image. By means of a mirror 3 (FIGS. 2, 2b) which reflects the scale upward substantially in the draw-out direction of the scale tape 1, the resulting scale value can be read laterally correctly.

The scale itself is graduated and inscribed in such a way that it does not indicate, for example as in the case of a conventional roll-type tape measure, the length of the distance between retaining part 21 (point of engagement) on the spacer 20 and measuring spindle 10 of the housing of the roll-type tape measure 2 but directly indicates the height h=c+d of the optical axis 30 above the reference plane defined, for example, by a boundary stone 31. For this purpose, the scale on the scale tape 1 is converted using Pythagoras' law according to $a^2=b^2+c^2$. Here, a is the distance from the point of contact of the spacer 20 (with the scale tape or an applied plumb bar according to FIG. 6) to the foot of the plumb line 32 on the reference point or the reference area, b is the horizontal distance of the end of the spacer 20 from the plumb line 32 and c is the length of the plumb line 32 from the foot of the plumb line to the point of intersection of the distance b with the plumb line 32. Furthermore, the constant, known height d of the optical axis 30 of the tool above the point of intersection of the line from the end of the spacer 20 with the plumb line 32 has been taken into account in an additive manner. The dimensioning of the scale on the scale tape 1 is calculated as follows:

$$h=d+\sqrt{a^2-b^2}$$

Of course, this formula corresponds only to a horizontal distance. It should be changed accordingly depending on the specific angular position thereof.

The desired height of the geodetic tool above the foot of the vertical is thus obtained.

Figure 6:
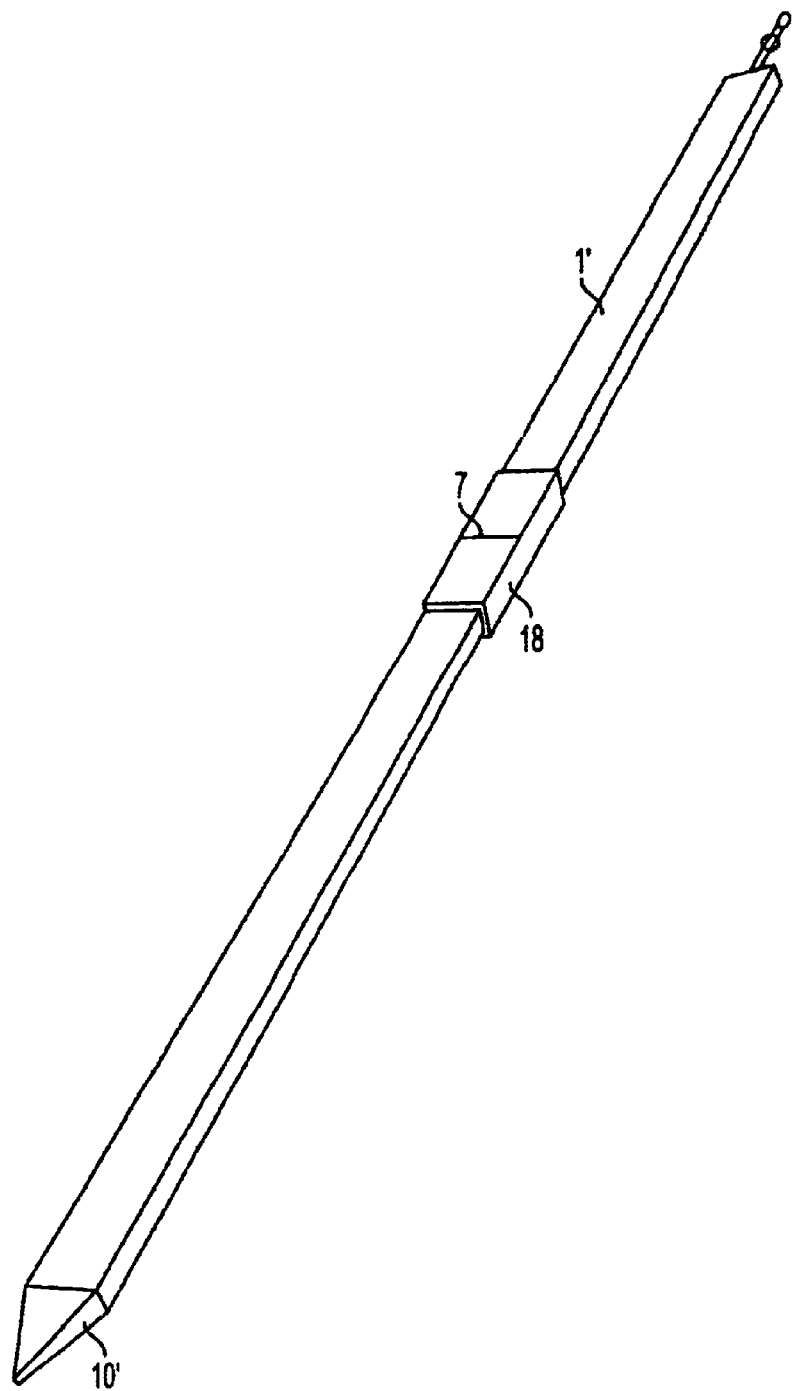
FIG. 6 shows a plumb bar for holding one or more, optionally coded scales.

Instead of the roll-type tape measure 2, it is also possible to use, for example, a plumb bar, which can be formed, for example, according to FIG. 6. The plumb bar is placed on the boundary stone 31 and held against the retaining part 21 of the spacer and read there. The scale mounted on the plumb bar is then once again calculated using the above formula.

The spacer 20 is fastened to the already horizontal upper part of the tribrach 27, at points with the greatest distance from the plumb line. The end of the spacer 20 is directed between the top fastenings of two tripod legs so that the scale tape 1 can be easily drawn out between the tripod legs, downward in the direction of the reference point. The reference point in the boundary stone 31 is usually characterized by an indentation. Expediently, the measuring spindle 10 on the housing of the roll-type tape measure 2 is easily positioned outside the marking on the boundary stone, preferably at that point of the boundary stone 31 which determines the reference area. However, the resulting inaccuracy of the measurement can be neglected.

The spacer 20 is preferably designed in such a way that the instrument-specific, previously known height d is adopted in an adapter-specific manner. This makes it possible to use the same roll-type tape measure for different versions of geodetic tools, since the additive height is then omitted. For tribrachs 27 and tools 28 of different makes, it is then possible to provide separate adapters in each case.

Figure 2:
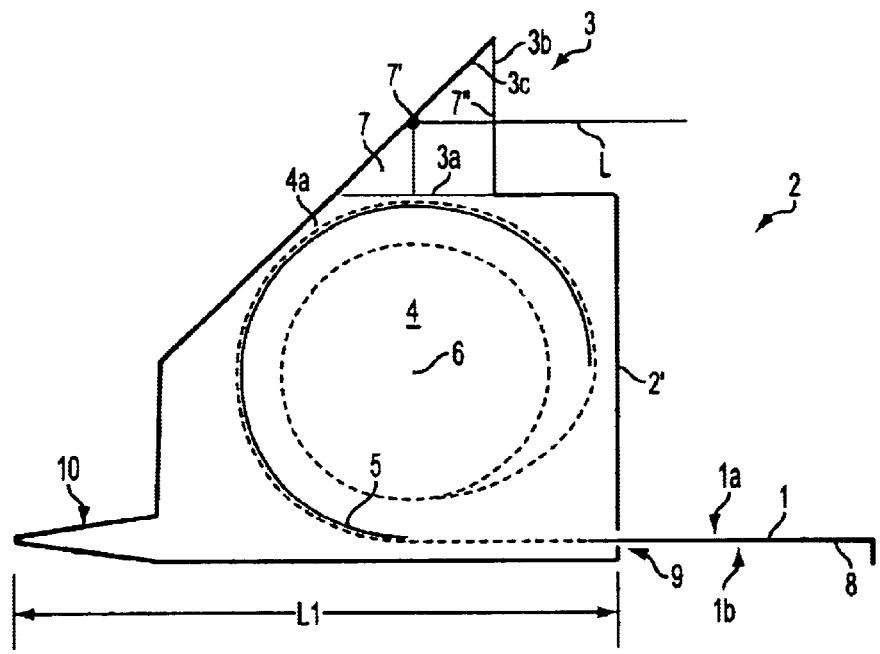
FIG. 2 shows a roll-type tape measure in cross-section.

FIG. 2 shows a roll-type tape measure 2 in cross-section by way of example. The scale tape 1 is drawn out of the housing 2' of the roll-type tape measure 2 against a restoring force of a scale tape roll 4. The scale present on the outside of the roll can be read by means of a reflecting prism 3 fastened to the housing 2'. The prism has a surface 3a opposite the roll, a surface 3b which faces the operator and a surface 3c having reflective properties, so that light from the scale is reflected by the side 3c toward the operator. A reading mark 7, for example a colored reading line, is incorporated into the side 3a. To keep the parallax during reading as small as possible, the scale tape is passed over a guide surface 5 or over a guide web, in each case arranged opposite the reading line. The reflective surface makes an acute angle with the draw-out direction of the scale tape. Consequently, the scale tape can be read from the top, i.e. in the draw-out direction.

As an alternative to a reflective prism, it is also possible to use a conventional mirror, which is mounted in place of the surface 3c of the prism. The housing is then provided with an inspection window instead of the surface 3a of the prism. In this version having a mirror or prism, the scale is marked as a mirror image on the scale tape 1. Confusion with other scales on the scale tape which are not applied as a mirror image is therefore prevented.

The measuring spindle 10 is pointed and forms an extension of the plane of the measuring tape. It thus permits exact positioning of the roll-type tape measure on the reference area. The measuring spindle 10 is preferably hinged. This enables the roll-type tape measure 2 to be used for different purposes.

The prism is arranged in such a way that the operator can read the distance as far as possible without parallax.

Figure 2A:
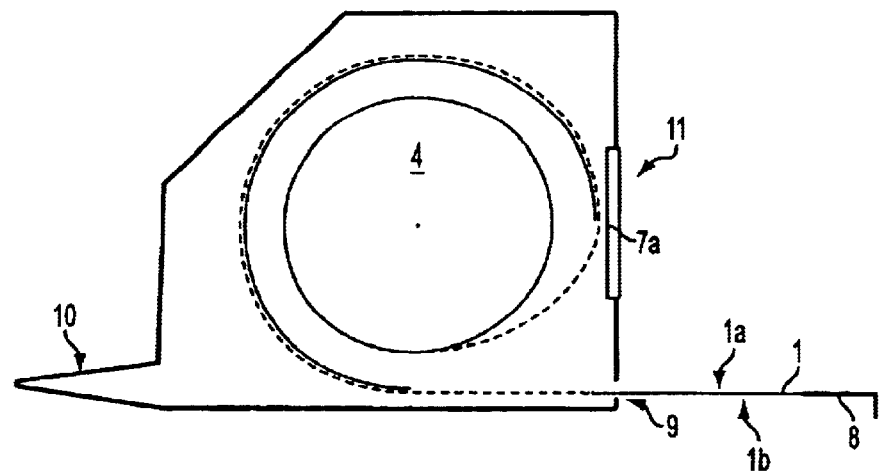
FIG. 2a shows a further design of the roll-type tape measure in cross-section.

It is also possible for an inspection window 11 to be arranged on the housing instead of a mirror, as shown in FIG. 2a, via which the scale is read directly. The corresponding scale is then applied to the other side of the tape and accordingly without lateral inversion.

Figure 2B:
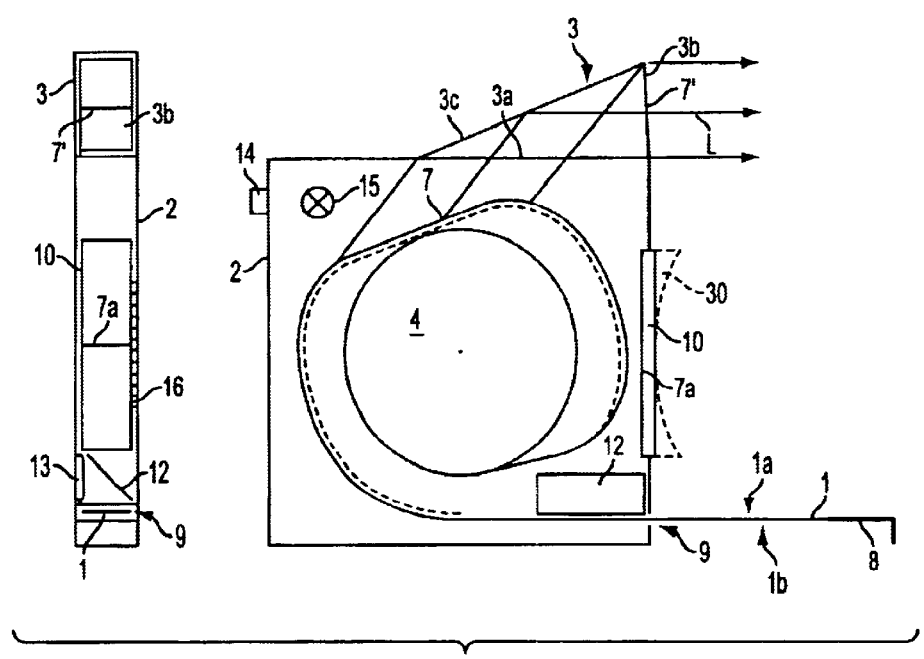
FIG. 2b shows a roll-type tape measure having in each case two scales on both sides of the scale support, one of the two scales being a mirror image in each case.

FIG. 2b shows a roll-type tape measure which optionally has four scales on both sides of the scale support, two per side. One of the two scales on each of the two sides of the scale support is a mirror image. One of the scales on side 1a is read directly at the slit 9 and the other scale which is upside down and a mirror image is read via the mirror 12 through the inspection window 13.

If, as in this case, two scales are present on the same side of the scale support, one of which is upside down and a mirror image, this permits reading of the scale support from any desired direction since one of the two scales is always readable while the other upside down scale can be read using the mirror. A reading error due to confusion of the two scales is likewise substantially ruled out by this representation of the scales.

The scales present on side 1*b* of the scale support are read using the mirror 3 or using the inspection window 11.

In this case, the mirror is inclined at an angle which is more acute than 45°. The reading area is compressed. Reading marks 7, 7' are present directly above the scale tape 1 and on the user-side window 3*b* in order to keep the parallax small.

Since the light path via the mirror 3 is considerably longer than that through an inspection window and only light which penetrates from outside through the mirror to the scale support 1 can be reflected, a small light 15, for example an incandescent bulb or a light emitting diode, can be mounted in the region of the scale for better readability of the scale and is switched on and off by simple means, for example a pushbutton 14 on the surface of the housing 2'. This is useful in particular where outdoor light conditions are poor.

The electrical energy for operating the light can be provided by a battery. However, it is also possible for a battery to be charged by means of a small generator which is driven by the pulling out of the scale tape. It is also possible to charge a capacitor, which however need not be charged exclusively by means of an electric motor but also electrostatically.

Other possible variants for such roll-type tape measures have been described in the Swiss Patent Application filed by the same applicant on the same date and having the title "Messgerät, insbesondere Längenmessgerät, mit mindestens zwei Skalen" [Measuring instrument, in particular length measuring instrument, having at least two scales] and are hereby considered to have been disclosed.

Figure 3:
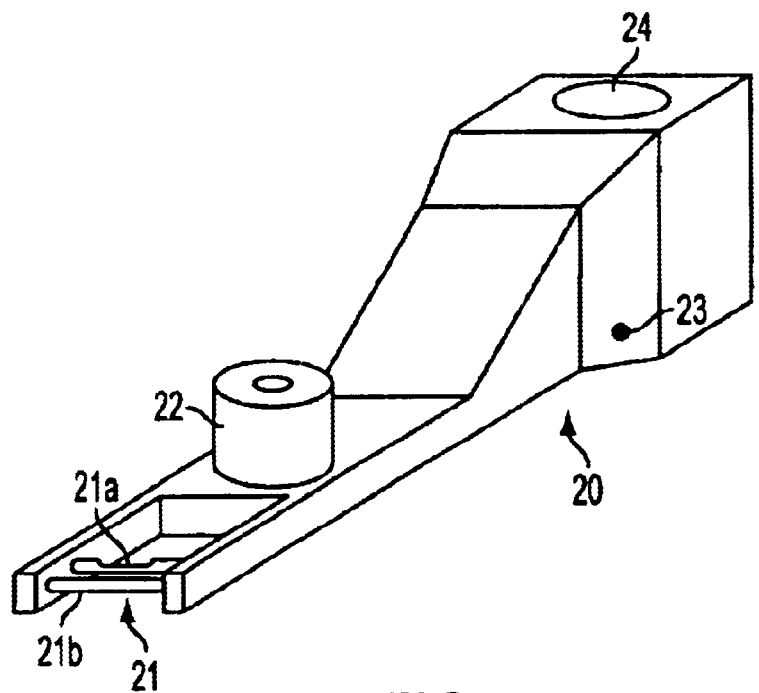
FIG. 3 shows a spacer having a retaining part for fastening a hook provided on that end of the scale support which is drawn out.

A possible embodiment of a spacer 20 is shown in perspective in FIG. 3. The spacer 20 is fastened to the already horizontal upper part of the tribrach 27, at the points with the greatest distance from the plumb line. The end of the spacer 20 is directed between the top fastenings of two tripod legs, as shown in FIG. 1. Present there is a cap 19 (cf. FIG. 4*b*) for one of the adjusting screws, via which the spacer 20 is pushed in and positioned by means of a hole 24 provided in said spacer. Screws 23 which permit horizontal alignment of the spacer 20, which can be checked by means of a spirit level 22, are arranged on either side of that region of the spacer 20 which is coordinated with the tribrach 27. The provision of screws and/or of a spirit level is optional and is intended for improving the safe horizontal alignment. Located at the outer end of the spacer 20 is the retaining part 21 into which a hook mounted in a conventional manner at the end of the scale tape 1 is introduced. This retaining part comprises two parallel rods 21*a* and 21*b*. The former is optionally rotatably mounted and has a cut-out through which the hook of the roll-type tape measure is passed.

Figure 3A:
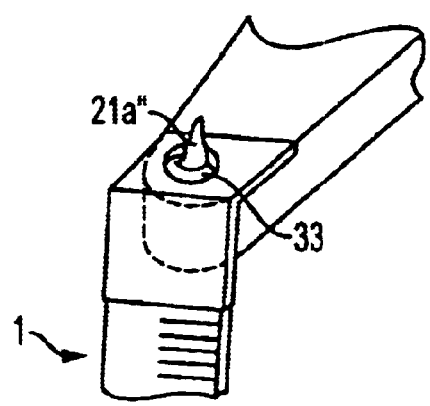
FIG. 3a shows an embodiment of the retaining part of the spacer.

FIG. 3*a* shows an alternative fastening variant in which a spike 21*a"* is provided as a retaining part on the spacer 20, by means of which spike the hook end of the scale tape 1 is fastened with a recess 33.

Figure 4A:
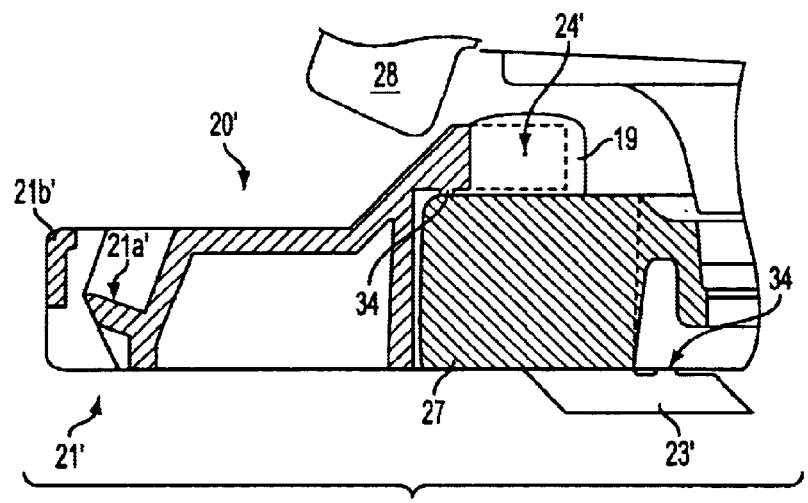
FIG. 4a shows a further embodiment of the spacer in elevation.
Figure 4B:
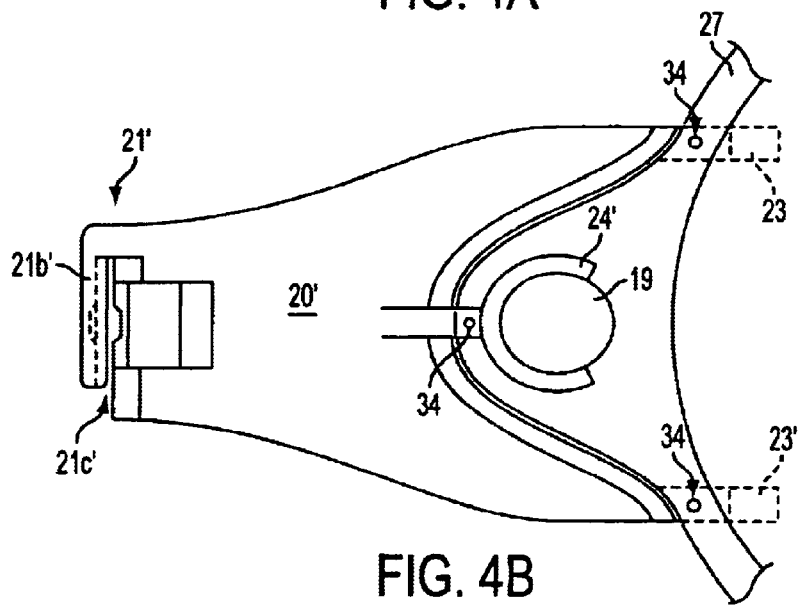

A variant for a spacer 20' according to the invention is shown in FIG. 4*a* in elevation and in FIG. 4*b* in plan view. As described above, it is fastened to the already horizontal tribrach 27, at the cap 19 of the adjusting screw by means of a clamp 24' provided instead of the hole 24 shown in FIG. 3. Two feet 23' on the underside of the spacer 20' engage the tribrach 27 from below, so that the spacer 20' is fastened in a substantially firmly clamped manner to the tribrach 27 and is horizontally positioned. Contact points 34 on the feet 23' and in the region of the spacer 20' resting on the top of the tribrach 27 advantageously prevent rotation of the spacer 20' in the height direction. The retaining part 21' for the hook 8 provided on that end of the scale tape 1 which is to be drawn out is present at that end of the spacer 20' which faces away from the tribrach 27. The geodetic tool 28 is indicated in FIG. 4*a*.

Figure 4C:
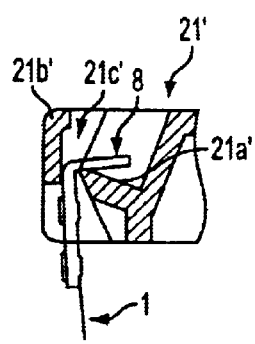
FIG. 4c shows a detail of the spacer from FIG. 4, showing the retaining part 21 for the hook 8 for the roll-type tape measure.

FIG. 4*c* shows the retaining part 21' with the hook 8 of the roll-type tape measure 2 already fastened therein. The retaining part 21' comprises a support part 21*a'* on which the hook 8 rests and a fastening part 21*b'* which prevents the hook 8 from slipping off the support part 21*a'*. A slot 21*c'* which is sufficiently wide to permit easy insertion of that end of the scale tape 1 which is to be drawn out is arranged laterally between support part 21*a'* and fastening part 21*b'*. This facilitates the fastening of the hook 8. In order to fasten the scale support, it is inserted into the slot 21*c'*. The scale tape 1 is then drawn downwards so that the hook 8 slides from above into the region of the slot 21*c'* until it rests firmly against the support surface. The hook 8 is thus fixed and the roll-type tape measure can, as seen in FIG. 1, be drawn out and positioned for measuring the distance between, for example, the optical axis of a theodolite and a reference point.

Figure 5A:
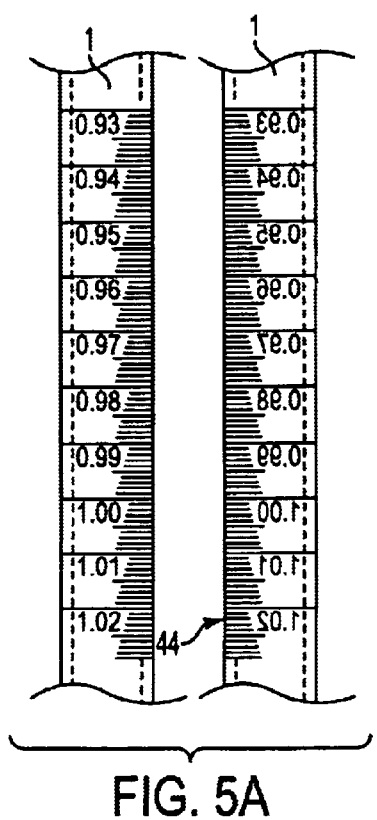
FIGS. 5a, 5b show different scales which can be mounted on the scale support.
Figure 5B:
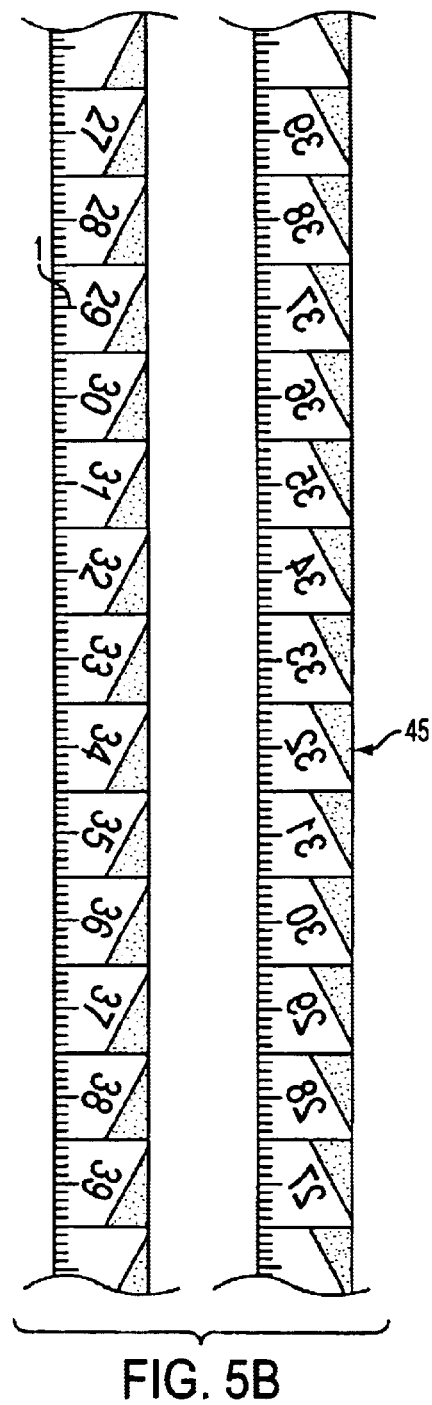

Sections of scales applied to the scale tape 1 are shown in FIGS. 5*a* and 5*b*. The scale in FIG. 5*a* has a nonlinear scale graduation according to the abovementioned formula. It may be represented as a mirror image to enable it to be read laterally correctly via the prism 3 (FIG. 2 or 2*b*) or may be represented in the usual manner for the design having a conventional inspection window. FIG. 5*b* shows a scale of a different design which likewise results in a reduction in the error in reading.

Owing to the different graduation marks becoming longer with increasing measured quantity, error-free reading is ensured even in the case of a mirror-image representation and also when only a relatively small section of the scale support is visible in the reading region. This is achieved, for example, by graduation marks 44 of different lengths. Thus, for example, the value 0.1 has the shortest graduation mark and the value 0.9 the longest graduation mark, possibly with the exception of the value 0.5. In a similar manner, it should be possible to provide a representation in wedge or arrow form 45, as shown in FIG. 5*b*.

FIG. 6 shows a plumb bar 1' having one or more—optionally coded—scales which can be read by a reading means in the form of a slide 18, optionally provided with a reading mark 7. At least one of the applied scales is nonlinear and is calculated according to the abovementioned formula. The lower edge of the plumb bar can be in the form of a pointed stop 10' in order to ensure the positioning of the bar on the reference point and hence to minimize measurement errors. For measurement of the height, the bar is placed on the reference point and is held against the spacer so that the height are [sic] directly or—in the case of a plurality of scales optionally otherwise to be confused—only using the reading means formed in one of the manners described above.

What is claimed is:

1. A system for determining a height (h) of a horizontally aligned geodetic tool (28) having a tool center (30) above a reference area, which tool (28) is set such that the tool center (30) is situated on a plumb line (32) passing through a reference point of the reference area, and which height (h) is the distance between the reference point and the tool center (30) comprising:

a spacer (20) having a retaining part (21), which spacer is removably, directly or indirectly fastenable to the tool (28) in such a way that the retaining part (21) is situated in a predetermined, unalterable, horizontal distance (b) and a predetermined, unalterable, vertical distance (d) to the tool center (30);

a means for measuring the height (h) by locating said means between the retaining part (21) and the reference point, said means having a nonlinear scale which is designed using the relationship $h=d+\sqrt{a^2-b^2}$, wherein (a) is the distance between the retaining part (21) and the reference point;

whereby the height (h) is determinable without any calculation, just by reading the nonlinear scale.

2. The system as claimed in claim 1 wherein the tool (28) is mounted on a horizontally aligned tribrach (27) which is attached to a tripod plate (26) of a tripod (25) and wherein the spacer (20) is fastenable to the tribrach (27).

3. The system as claimed in claim 2, wherein the means for measuring the distance (a) is a roll-type tape measure having a measuring spindle (10) at one end for placing on the reference point.

4. The system as claimed in claim 2, wherein the means for measuring the height (h) is a plumb bar (1') having a stop (10') at one end for placing on the reference point.

5. A spacer (20) for a system for determining the height (h) of a geodetic tool (28) having a tool center (30) above a reference area mounted on a horizontally aligned tribrach (27), which tool (28) is set such that the tool center (30) is situated on a plumb line (32) passing through a reference point of the reference area, and which height (h) is the distance between the reference point and the tool center (30);

which spacer (20) is removably fastenable to the tribrach (27) and has a retaining part (21) for retaining a means for measuring the height (h) by locating said means between the retaining part (21) and the reference point, said means having a nonlinear scale which is designed using the relationship $h=d+\sqrt{a^2-b^2}$, wherein (a) is the distance between the retaining part (21) and the reference point; and wherein the retaining part (21) is situated in a predetermined, unalterable, horizontal distance (b) and in a predetermined, unalterable, vertical distance (d) to the tool center (30)

wherein the spacer (20') comprises a clamp (24') for gripping a cap (19) of an adjusting screw provided for the horizontal alignment of the tribrach (27) and two feet (23') for engaging the underside of the tribrach (27).

6. A distance measuring device for determining a height (h) of a horizontally aligned geodetic tool (28) having a tool center (30) above a reference area, which tool (28) is set such that the tool center (30) is situated on a plumb line (32) passing through a reference point of the reference area, wherein a retaining part (21) is attached to the tool (28) in such a way that the retaining part (21) is situated in a predetermined, unalterable, horizontal distance (b) and a predetermined, unalterable, vertical distance (d) to the tool center (30), which distance measuring device comprising:

a means for measuring the height (h) by locating said means between the retaining part (21) and the reference point, said means having a nonlinear scale which is designed using the relationship $h=d+\sqrt{a^2-b^2}$, wherein (a) is the distance between the retaining part (21) and the reference point:

whereby the height (h) is determinable without any calculation, just by reading the nonlinear scale.

7. The distance measuring device as claimed in claim 6, wherein the means for measuring the distance comprises a scale support (1, 1') on which at least one first and one second scale are applied, at least one of the scales being applied in coded form not directly readable, which scale is indirectly readable by a reading means (3, 18) coordinated with the scale support (1, 1') and having a reading mark (7).

8. The distance measuring device as claimed in claim 7, wherein at least one scale is coded in one of the following ways:

the scale is applied as a mirror image on the scale support;

the scale is provided with a color overprint.

9. The distance measuring device as claimed in claim 7, wherein the reading means is formed in one of the following ways:

the reading means is in the form of a mirror or prism;

the reading means is in the form of a color filter.

10. The distance measuring device as claimed in claim 7, wherein at least one of the scales is formed in such a way that each dimension specified numerically is coordinated with direction information directly indicating the ascending or descending measured value series, wherein said direction information is selected from the group consisting of:

a graduation mark sequence increasing in length, a wedge-shaped mark, and an arrow-shaped mark (23) provided between the dimensions.

* * * * *